United States Patent [19]

Eisen

[11] Patent Number: 5,137,292
[45] Date of Patent: Aug. 11, 1992

[54] ALL-WHEEL STEERING FOR MOTOR VEHICLES

[75] Inventor: Peter Eisen, Kernen, Fed. Rep. of Germany

[73] Assignee: Mercedes-Benz AG, Fed. Rep. of Germany

[21] Appl. No.: 616,924

[22] Filed: Nov. 21, 1990

[30] Foreign Application Priority Data

Nov. 23, 1989 [DE] Fed. Rep. of Germany ....... 3938801

[51] Int. Cl.⁵ .............................................. B62D 3/02
[52] U.S. Cl. ..................................... 280/91; 280/99; 180/140; 180/143
[58] Field of Search ................ 180/140, 143; 280/91, 280/99, 100, 101; 74/496, 105

[56] References Cited

U.S. PATENT DOCUMENTS 4,105,086 8/1978 Isii et al. ............................. 180/143

FOREIGN PATENT DOCUMENTS 3446881 7/1985 Fed. Rep. of Germany .
3630181 3/1988 Fed. Rep. of Germany .
3820967 1/1989 Fed. Rep. of Germany .
63-247170 10/1988 Japan .

Primary Examiner—Charles A. Marmor
Assistant Examiner—Anne Marie Boehler
Attorney, Agent, or Firm—Evenson, Wands, Edwards, Lenahan & McKeown

[57] ABSTRACT

An all wheel steering arrangement having a coupler lever mechanism between the front-wheel steering and rear-wheel steering. The transmission ratio between the steering angle of the front wheels and the steering angle of the rear wheels is controllable, the variation of the transmission ratio causing no steering deflections in the straight-ahead position of the steering. The steering angle of the rear wheels increases within a predeterminable range on both sides of the straight-ahead position with an increasing steering angle of the front wheels. As soon as a limit angle is reached, however, the steering angle of the rear wheels remains substantially constant, even when the steering angle of the front wheels increases further; and if appropriate, the steering angle of the rear wheels can even decrease somewhat.

21 Claims, 4 Drawing Sheets

ALL-WHEEL STEERING FOR MOTOR VEHICLES

BACKGROUND AND SUMMARY OF THE INVENTION

The invention relates to an all-wheel steering system for motor vehicles, with a randomly controllable front-wheel steering and rear-wheel steering which is positively coupled mechanically thereto.

An all-wheel steering system of this generic type is disclosed in German Patent document DE-OS 3,630,181, in which a link part is connected fixedly in terms of rotation to a cardan shaft which serves as a drive connection between the front-wheel and rear-wheel steering. The cardan shaft is positively coupled to the front-wheel steering via a crank arm arranged on the cardan shaft and via a linkage part articulated thereon. Gear elements, by which the transmission ratio between the steering angle of the front wheels and the steering angle of the rear wheels could be varied, however, are not provided.

A similar all-wheel steering arrangement is shown in Japanese Preliminary Publication 63-247170, in which a toothed pinion is positively coupled to the front-wheel steering via a cardan shaft. The toothed pinion itself drives a toothed quadrant connected fixedly in terms of rotation to an adjusting lever, the free end of which engages by means of a guide element into a slot arranged on the link part. Once again, however, there are no gear elements by which the transmission ratio between the steering angles of the front wheels and rear wheels could be varied.

German Patent Document DE-OS3,446,881 shows an all-wheel steering arrangement in which the rear-wheel steering is coupled mechanically to the front-wheel steering, and the transmission ratio between the steering angle of the front wheels and the rear wheels can be varied. A pivotable shaft part is arranged on an input shaft, positively coupled to the front-wheel steering, by means of a hinge-like fork joint, the hinge axis of which is aligned transversely relative to the axis of the input shaft. The end of the shaft part facing away from the fork joint is mounted rotatably on a connecting member, which is itself articulated on the track rods of the steerable rear wheels. By means of adjusting members, the connecting member can be moved vertically relative to the vehicle, in such a way that the shaft part is brought either into a position coaxial with the input shaft or into a position angled relative to the input shaft. As long as the input shaft and shaft parts are aligned coaxially with one another, a rotation of the input shaft cannot cause any movement of the connecting member, since the shaft part is rotationally mounted on the connecting member. However, when the shaft part is angled relative to the input shaft by pivoting about the axis of articulation of the hinge-like fork joint, during the rotation of the input shaft the shaft part acts in a similar way to a crank arm connected to the input shaft, and accordingly displaces the connecting member either to the right side or to the left side of the vehicle, depending on the direction of rotation of the input shaft, with the result that the steerable rear wheels are deflected correspondingly. Thus, the steering angle of the rear wheels depends both on the angle between the input shaft and the shaft part, and on the height setting of the connecting member. The transmission ratio between the front-wheel steering and the rear-wheel steering can thus be changed continuously.

A coupler mechanism of the all-wheel steering arrangement disclosed in German Patent Document DE-OS 3,446,881 affords the possibility of deflecting the rear wheels either in the same direction as the front wheels, but with a steering angle reduced in relation to the steering angle of the front wheels, or in the opposite direction to the front wheels. For this purpose, the connecting member merely has to be moved upwards or downwards by means of the adjusting members relative to its neutral position, in which the input shaft and shaft part aligned coaxially with one another.

It is thus basically possible to control the transmission ratio of the coupler mechanism as a function of driving speed, specifically in such a way that, at a very low speed such as is typical for parking maneuvers, the front and rear wheels are deflected in opposite directions in order to increase the maneuverability of the vehicle. Within a narrow range of moderate to medium speeds, the transmission ratio of the coupler mechanism usually has the value zero. (In this case, in the coupler mechanism of German Patent Document DE-OS 3,446,881, the input shaft and shaft part are aligned coaxially with one another.) That is to say the rear wheels remain constantly in their straight ahead position, irrespective of the particular steering angle of the front wheels. At higher speeds, especially also at maximum speed, the rear wheels can then be deflected in the same direction as the front wheels, but with steering angles smaller in comparison with the front wheels, particularly in order to increase the controllability of the vehicle during a rapid toe change or on "snaking" roads. Because the rear wheels are deflected in the same direction as the front wheels, a certain slip angle of the rear wheels is obtained at the very start of a steering maneuver, without a rotational movement of the vehicle about its vertical axis being necessary. The rear wheels can thus absorb high lateral forces at the very start of the steering maneuver.

In the transitional ranges between a very low and medium speed on the one hand and a medium speed and higher speed on the other hand, the transmission ratio of the coupler mechanism can be varied continuously. Thus, if the speed range with a deflection of the rear wheels in the opposite direction to the front wheels is assigned negative values of the transmission ratio, whilst the transmission ratio for the deflection of the rear wheels in the same direction as the front wheels is defined as positive, the transmission ratio increases more or less continuously with increasing driving speed.

It is known, in principle, to use electronic circuits for speed-dependent control of the transmission ratio of a coupler mechanism between a front-wheel and a rear-wheel steering. These circuits constantly carry out fault monitoring. Upon detection of a fault, separate asjustment members automatically adjust the coupler mechanism so that the transmission ratio has its maximum value and the front and rear wheels are always deflected in the same direction as one another.

In this emergency mode, driving safety is afforded unrestrictedly because the all-wheel steering behaves in the same way as at maximum speed, and with a fault-free transmission control of the coupler mechanism. However, the maneuverability of the vehicle is reduced because the deflection of the rear wheels in the same direction as the front wheels takes place even at a slow driving speed. In order nevertheless to avoid any unacceptable losses of maneuverability, all-wheel steering arrangements are often designed in such a way that the deflection of the rear wheels cannot exceed a limit value of, for example, 4°, even when the front wheels are deflected as far as their construction allows (for example by approximately 45°). If appropriate, it is even possible for the steering angle of the rear wheels to decrease after the limit angle has been reached, or even for a deflection of the rear wheels in the opposite direction to the front wheels to take place when the front wheels are deflected exceptionally far.

Coupler mechanisms, albeit highly complicated ones, have already been designed, which, when a maximum transmission rataio is set between the deflection of the front wheels and the deflection of the rear wheels in the same direction as this, prevent the limit angle of the rear-wheel steering angle from being exceeded even when the front-wheel steering is subjected to an extremely hard lock. The coupler mechanisms designed hitherto are complicated, especially when the desired limitation of the rear-wheel steering angle is to be obtained solely by means of the kinematics of the coupler mechanism. In this case there must be a path dependent transmission ratio between the adjusting paths of the mechanism input and output.

In order to simplify the coupler mechanisms, spring elements (preferably prestressed), have been provided between the output of the coupler mechanism and the rear-wheel steering, and stops have been used to limit the steering angle of the rear wheels. Within the range determined by the stops, the adjusting stroke of the output of the coupler mechanism can then be transmitted virtually unchanged to the rear-wheel steering via the spring elements. When the stops are reached, and the front-wheel steering angle continues to increase, the steering angle of the rear wheels remains unchanged; that is, further movement of the coupler mechanism in response to increasing front-wheel steering angle simply exerts increasing tension of the spring elements, or causes an increase in the stop forces. The disadvantage of this concept however, is that in the transmission path between the rear-wheel steering and coupler mechanism there is a normally undesirable elasticity which, under high forces acting on the rear wheels from outside, can prevent an exact match between the steering movements of the rear wheels and the output of the coupler mechanism. Moreover, the spring elements tend to increase the steering resistance as soon as the stops limiting the steering angle of the rear wheels take effect.

Desirably simple mechanical coupler mechanisms satisfying all requirements have not yet been developed for all-wheel steering mechanisms.

For example, while German Patent Document DE-OS 3,820,967 shows an all-wheel steering arrangement in which the coupler mechanism between the front-wheel steering and rear-wheel steering has a relatively simple constructional design, it does not afford any possibility of limiting the rear-wheel steering angle when the front-wheel steering is at a very hard lock.

In principle, instead of mechanical coupler mechanisms, hydraulic coupling arrangements, or even electronically controlled systems working without any mechanical or hydraulic coupling, can also be provided for the rear-wheel steering. However, systems of this type offer a degree of safety comparable to that of mechanical coupler mechanisms only when multiple redundant essential elements are provided.

The object of the present invention is, therefore, to provide an all-wheel steering system with a positive mechanical coupling between the front and rear-wheel steering, which is especially simple in constructional design, but nevertheless makes it possible to obtain the desirable limitation of the rear-wheel steering angle solely by means of its kinematics.

According to the invention, this object is achieved in an all-wheel steering system having a front and rear-wheel coupler mechanism which is connected to the front-wheel steering, and which has a four-bar lever mechanism with two levers pivotable about stationary axes, and a link part which is connected to the free ends of the levers via pivotable joints. During the pivoting of the levers within a predetermined pivoting range, the link part executes a rotational movement in which a connection part arranged thereon describes a C-shaped or U-shaped path and displaces a rod, of which one end is articulated to the connection part and the other end is connected in driving terms to the rear-wheel steering. The rod is thus guided on a path which, in a top view of the C-shaped or U-shaped path, extends transversely relative to the C-legs or U-legs. The front-wheel steering is connected in driving terms to an input lever pivotable about a third stationary axis, and a further lever articulated adjustably on the free end of the input lever is coupled in an articulated manner to one lever of the four-bar lever mechanism via a connecting rod. The input lever, the further lever and the connecting rod have equal effective lengths, and in the straight-ahead position of the steering, the articulated connections between the connecting rod and the one lever and between the input lever and the further lever are located one above the other, with mutually aligned axes of articulation.

By adjusting the angle between the input lever and the further lever, the transmission ratio between the pivoting strokes of the input lever and of the one lever of the four-bar lever mechanism can be varied continuously, and a reversal of the relative directions of movement is also possible. Accordingly, depending on the set transmission ratio, the end of the rod located on the output side of the four-bar lever mechanism (that is, the end articulated to the connection part) covers distances of differing length on the C-shaped or U-shaped path when the input lever is pivoted through a predetermined angle. If the angle between the input lever and the further lever has the value zero, that is to say when the input lever and the further lever are located one above the other, as seen in the direction of the third stationary axis, then pivoting of the input lever causes no movement of the rod located on the output side of the four-bar lever mechanism.

Other objects, advantages and novel features of the present invention will become apparent from the following detailed description of the invention when considered in conjunction with the accompanying drawings.

DETAILED DESCRIPTION OF THE DRAWINGS

Figure 1:
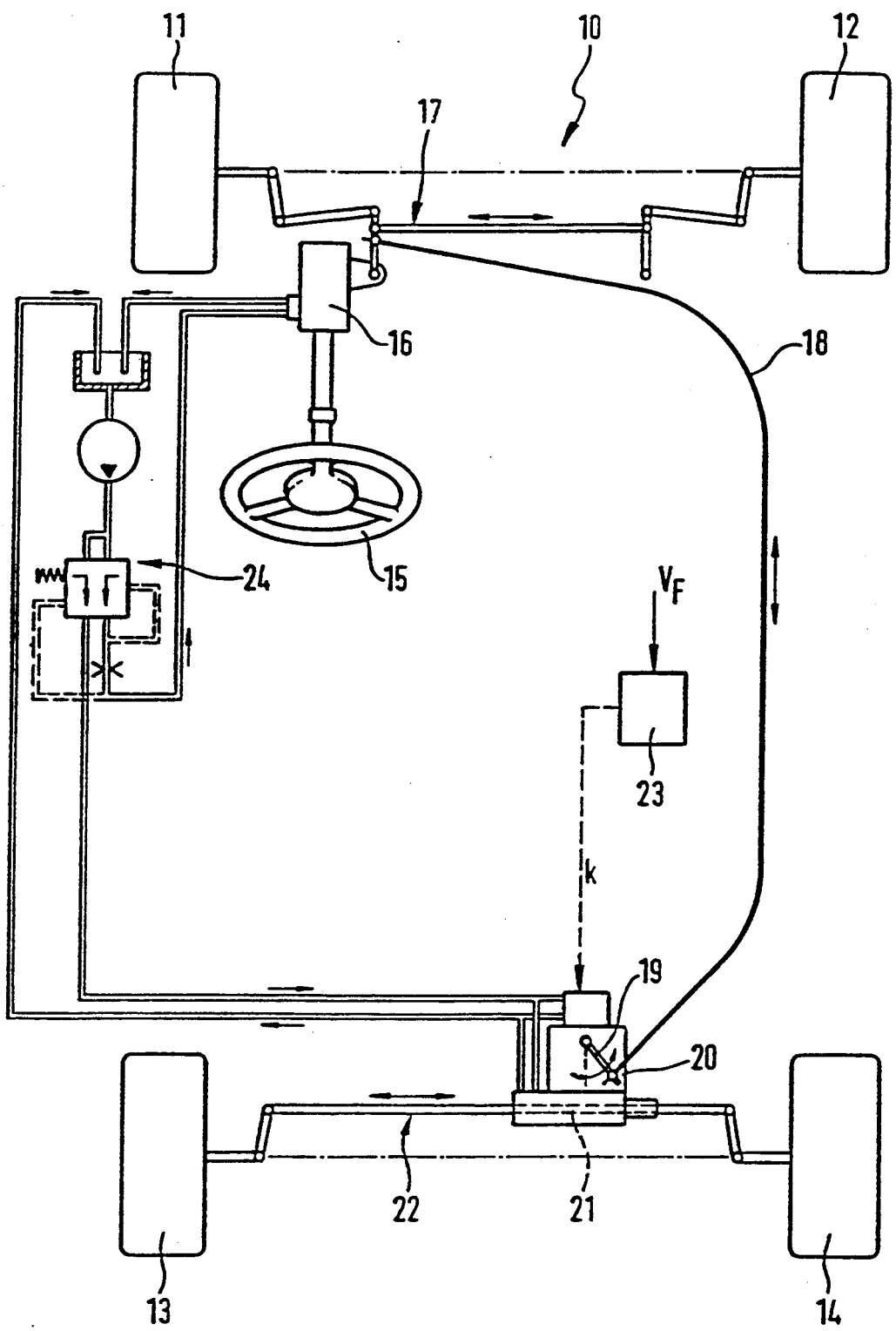
FIG. 1 shows a general diagrammatic representation of an all-wheel steering system according to the invention.

The chassis 10 of a passenger car, shown diagrammatically in FIG. 1, possesses steerable rear wheels 13 and 14. A steering wheel 15 actuates the steering of the front wheels 11 and 12 in a customary manner, and is positively coupled mechanically to the steering linkage 17 of the front wheels 11 and 12 via a steering gear 16.

The steering linkage 17 of the front wheels 11 and 12 is positively coupled mechanically via a pull-and-push cable 18 to the input levers 19 of a steering gear 20 for the rear wheels 13 and 14. The output member of the steering gear 20 of the rear wheels 13 and 14 is a push rod 21 which itself forms part of the steering linkage 22 of the rear wheels 13 and 14 or which is connected in driving terms to the steering linkage 22 of the rear wheels 13 and 14.

The transmission ratio between the pivoting stroke of the input lever 19 and the displacement stroke of the output-side push rod 21 of the rear steering gear 20 can be varied in a manner described in detail below. This function is performed by an electronic control unit 23 which controls the transmission ratio of the rear steering gear 20 as a function of an input signal, preferably the speed $V_F$ of the vehicle, by actuation of a corresponding adjusting member.

In order to minimize the force necessary to turn the steering wheel 15, a servo system 24 is provided to assist the front and rear steering gears in a known manner. In the example illustrated, the servo system includes a servomotor interacting with the front steering gear 16 on the one hand, and a further servomotor interacting with the rear steering gear 20, on the other hand. In principle, however, it is also possible to provide only a single servomotor interacting with the front steering gear 16, because the front steering gear 16 is positively coupled to the rear steering gear 20 via the front steering linkage 17 and the pull-and-push cable 18. Therefore a servomotor arranged only on the front steering gear 17 can also overcome the adjusting forces necessary to steer the rear wheels 13 and 14.

Figure 2:
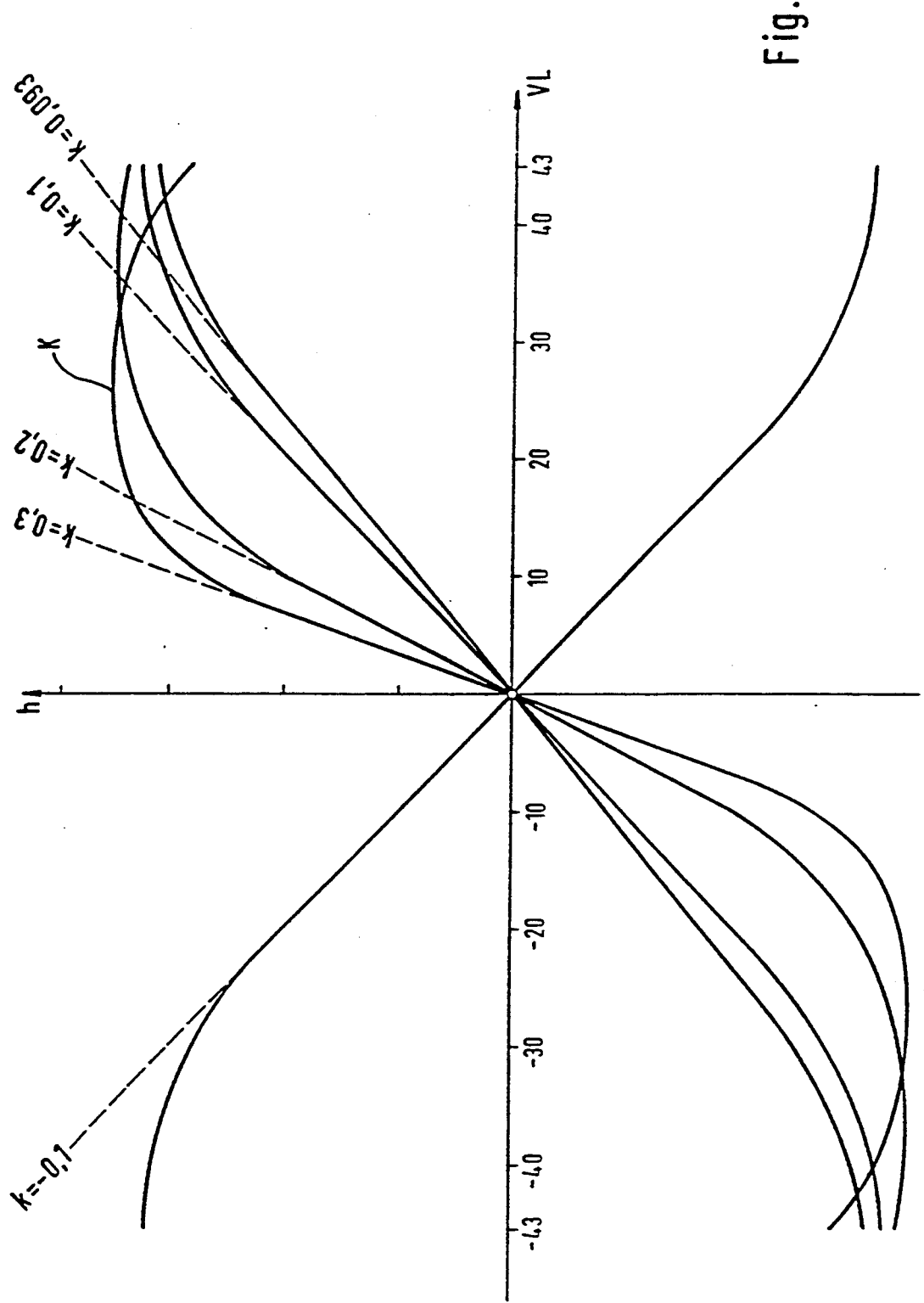
FIG. 2 shows a graph which depicts the steering angle of the rear wheels as a function of the steering angle of the front wheels, for different transmission ratios of the coupler mechanism.

FIG. 2 shows the adjusting stroke h of the output-side push rod 21 of the rear steering gear 20 as a function of the steering angle VL of the front wheels 11 and 12 for different values of the transmission ratio k. It is to be noted in this respect that the input lever 19 of the rear steering gear 20 changes its pivoting position to conform to the steering angle of the front wheels 11 and 12. Accordingly, FIG. 2 also reproduces the adjusting stroke of the output-side push rod 21 of the rear steering gear 20 as a function of the pivoting stroke of the input lever 19.

Negative and positive values of the transmission ratio k illustrate that the direction of movement of the push rod 21 and input lever 19 can also be reversed relative to one another. That is to say, the rear wheels 13 and 14 can be deflected on the one hand in the same direction as, and on the other hand in the opposite direction to, the front wheels 11 and 12, and because of the transmission ratios obtainable, the steering angles of the rear wheels are respectively smaller than the steering angles of the front wheels.

At a high speed, a relatively high transmission ratio, for example K=0.3, is set. Accordingly, the stroke h of the output-side push rod 21 of the steering gear changes to a comparatively pronounced extent when the front-wheel steering is deflected to the right (positive values of the front-wheel steering angle VL) or the left (negative values of the front-wheel steering angle VL). If the front-wheel steering is deflected extremely far to the right or left, the stroke position of the output-side push rod 21 now changes very little according to the limiting curve K; this effect is bassed on the kinematics of the rear steering gear 20 which are illustrated further below. This ensures in a desirable way that the steering angle of the rear wheels 13 and 14 cannot exceed a predetermined limit value. This is especially important when a fault occurs in the control unit 23, in which case, the maximum transmission ratio of the rear steering gear 20 is set automatically and maintained, and the rear wheels 13 and 14 are always deflected in the same direction as the front wheels 11 and 12. In this emergency mode, the limitation of the steering angle of the rear wheels prevents the maneuverability of the vehicle from being excessively impaired.

As shown in FIG. 2, when the limit angle has been reached and the steering angle of the front wheels continues to increase, the steering angle of the rear wheels decreases somewhat in order to allow a comparatively small minimum turning circle in the emergency mode.

For driving at high speed, the slope of the limiting curve K is of little or no consequence because the range of the limiting curve K can be reached only when the front wheels 11 and 12 are deflected sharply. However, such large front-wheel steering angles cannot be obtained during controllable high-speed driving.

When the speed of the vehicle moderates, the transmission ratio K is also reduced correspondingly, for example to the value k=0.1 at a medium speed.

When the speed decreases even further, the transmission ratio k can be set to zero. That is to say, the output-side push rod 21 of the rear steering gear 20 remains in a middle position irrespective of the steering angle of the front wheels 11 and 12; this is equilavent to saying that rear wheels 13 and 14 always assume their straight-ahead position.

At a very slow driving speed, such as is typical, for example, for parking maneuvers, negative values of the transmission ratio, for example k=−0.15, are set increasingly. This ensures that the rear wheels 13 and 14 are deflected in the opposite direction to the front wheels 11 and 12, thereby appreciably increasing the maneuverability of the vehicle.

Figure 3:
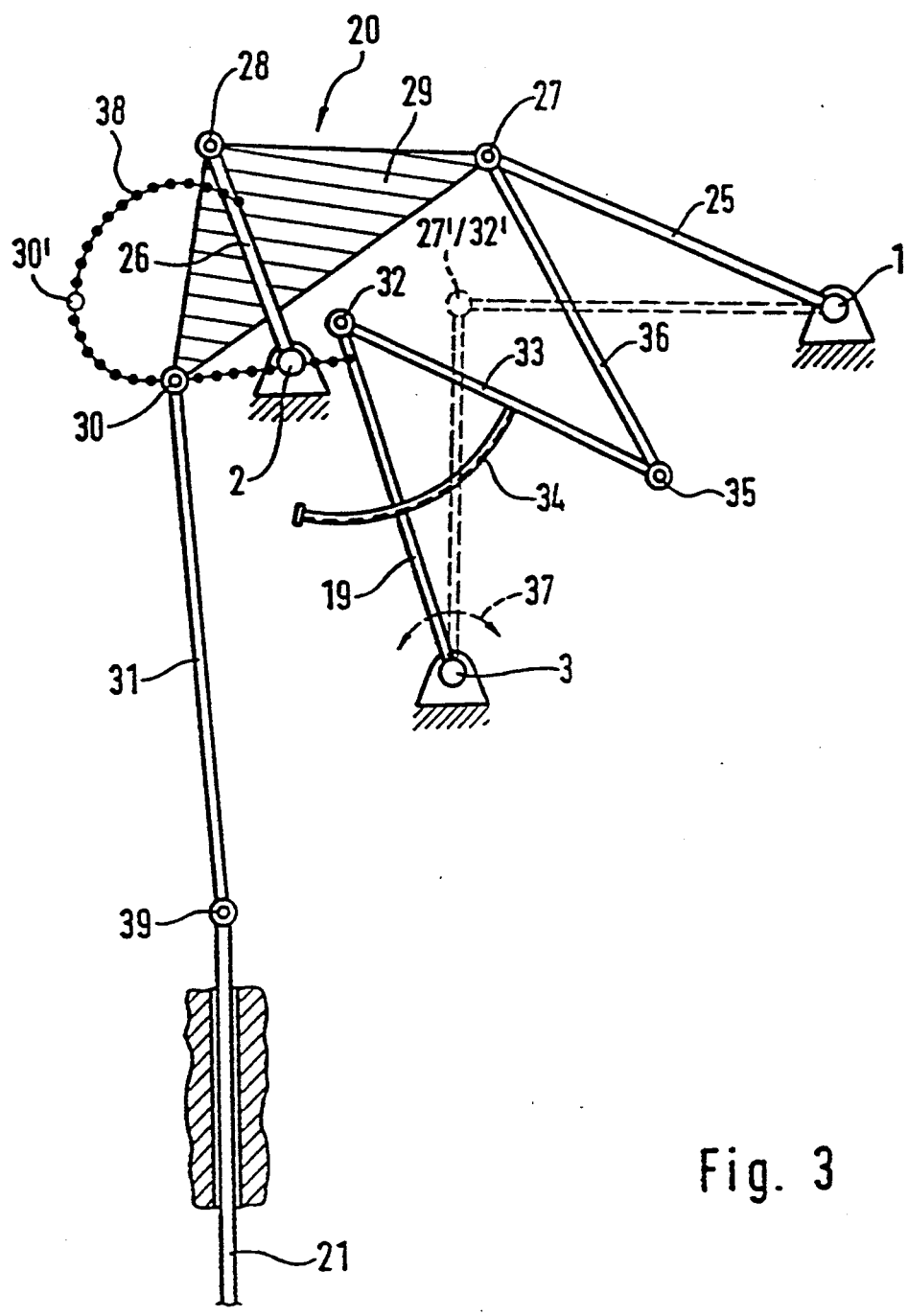
FIG. 3 shows a diagrammatic top view of the coupler mechanism according to a first embodiment.

FIG. 3 illustrates a first embodiment of the rear steering gear 20 which couples the rear-wheel steering of the vehicle with variable transmission ratio to the front-wheel steering of the vehicle. Elements in FIG. 2 corresponding to those in FIG. 1 have the same reference symbols in both figures.

The rear steering and coupler gear 20 has a four-bar lever mechanism with two levers of different lengths 25 and 26 which are pivotable about stationary axes 1 and 2 and the free ends of which are pivotably connected to a link part 29 by means of joints 27 and 28.

Arranged on the link part 29 at a distance from the two joints 27 and 28 is a connection part 30 which is designed as a further joint and on which is articulated a connecting rod 31, the other end of which is connected by means of a joint 39 to the push rod 21 forming the output of the steering and coupler gear 20, and arranged slidably in a stationary guide.

The input lever 19 is arranged so as to be pivotable about a third stationary axis 3 which is aligned parallel to the stationary axes 1 and 2. At the free end of the input lever 19, a further lever 33 is arranged so as to be pivotally adjustable on a joint 32 and can be set at a desired angle relative to the input lever 19 within the adjustment range 34. As explained in detail below, the transmission ratio of the steering or coupler gear 20 is varied by varying the setting of this angle. The free end of the further lever 33 is connected in an articulated manner via a joint 35 to a connecting rod 36, the other end of which is connected to the joint 27 between the lever 25 and the link part 29.

So that the various mechanism elements do not impede one another, the levers 25 and 26 are arranged, for example, in a plane below the levers 19 and 33 and the connecting rod 36, whilst the connecting rod 31 and the push rod 21 are movable in an even lower plane beneath the levers 25 and 26.

The input lever 19, further lever 33 and connecting rod 36 have equal effective lengths, so that, in a middle position of the gear 20 (assigned to the straight-ahead position of the rear wheels 13 and 14), the joints 27 and 32 are located one above the other in the position 27′/32′, irrespective of the particular pivoting position in which the further lever 33 is set relative to the input lever 19, the distance between the third stationary axis 3 and the joint 27′ being substantially equal to the length of the input lever 19.

When the joints 27 and 32 are in the position 27′/32′, the connection part 30 is in the center position 30′. Now when the input lever 19, together with further lever 33 set relative to the input lever 19 in an angled position, as shown, for example, in FIG. 3, is pivoted to the right and left according to the double arrow 37, the connection part 30 of the link part 29 covers the C-shaped or U-shaped path 38 represented by dots. When the angle set between the input lever 19 and the further lever 33 is relatively large, the connection part 30 covers comparatively long distances on the path 38 during the pivoting of the input lever 19 through a predetermined angle. If the angle between the levers 19 and 33 is small, the distances covered by the connection part 30 on the path 38 are correspondingly shorter.

When the further lever 33 in FIG. 3 assumes a position on the left side of the input lever 19, the direction of movement of the connection part 30 on the path 38, on the one hand, and the direction of movement of the input lever 19 and further lever 33, on the other hand, are reversed relative to one another in relation to the state in which the lever 33 is retained on the right side of the input lever 19, shown if FIG. 3.

When the further lever 33 is set into a position directly above input lever 19, the further lever 33 can pivot jointly with the input lever 19 to any extent about the stationary axis 3, and the joint 27 and connection part 30 of the link part 29 at the same time always remain in the positions 27′/32′ or 30′; that is to say, the link part 29 remains at rest and the rear-wheel steering remains in its straight-ahead position, regardless of the steering angle of the front wheels.

As long as the input lever 19 is in its middle position assigned to the straight-ahead position of the front-wheel steering, in which the joints 32 and 27 are located one above the other in the position 27′/32′, the further lever 33 can be adjusted as desired relative to the input lever 19, the link part 29 at the same time remaining at rest, that is to say the connection part 30 remaining in the center position 30′. When the lever 19 is in its middle position, with joint 32 in the position 32′, a line connecting joints 27 and 28 forms an acute angle with lever 26, and the longitudinal axis of levers 25 and 26 intersect each other.

With the coupler mechanism 20 illustrated in FIG. 3, therefore, the relations shown in FIG. 2 between the front-wheel steering angle VL and the stroke h of the push rod 21 can be obtained.

It is essential for these kinematic relationships that, during a pivoting of the levers 25 and 26, the link part 29 executes on the one hand a translational movement, to the right and left in FIG. 3, and on the other hand a rotational movement, in FIG. 3 about an axis perpendicular to the drawing plane. The connection part 30 located at a distance from the joints 27 and 28 of the link part 29 is thus guided over the C-shaped or U-shaped path 38. Now since the connecting rod 31 and the push rod 21 are moveable essentially transversely relative to the legs of the C-shaped or U-shaped path 38, an appreciable displacement of the elements 21 and 31 occurs only as long as the connection part 30 of the link part 29 moves over the middle region of the C-shaped or U-shaped path 38 between the legs. As soon as the connection part 30 runs over the parts of the C-shaped or U-shaped path 38 which form the legs, the push rod 21 is virtually no longer adjusted at all, thus achieving the desired limitation of the maximum steering angle of the rear wheels 13 and 14.

To adjust the angle of further lever 33 relative to the input lever 19, and consequently to vary the transmission ratio between the pivoting stroke of the input lever 19 and the displacement stroke of the push rod 21, a hydraulic piston/cylinder unit (not shown) is provided, which can be supplied in a known manner via hydraulic lines accommodated in the lever 19 and connected to stationary lines in an articulated manner at the axis 3.

Should the control unit 23 controlling the piston/cylinder unit as a function of the driving speed $V_F$ detect a fault, the piston/cylinder unit is automatically brought into a state free of self-locking, so that a spring assembly (not shown) can set the further lever 33 relative to the input lever 19 into the extreme position, shown in FIG. 3, which at the same time is additionally secured, where appropriate, by interlocking. This guarantees a maximum transmission ratio k between the front-wheel and the rear-wheel steering during a deflection of the wheels 11 to 14 in the same direction.

Figure 4:
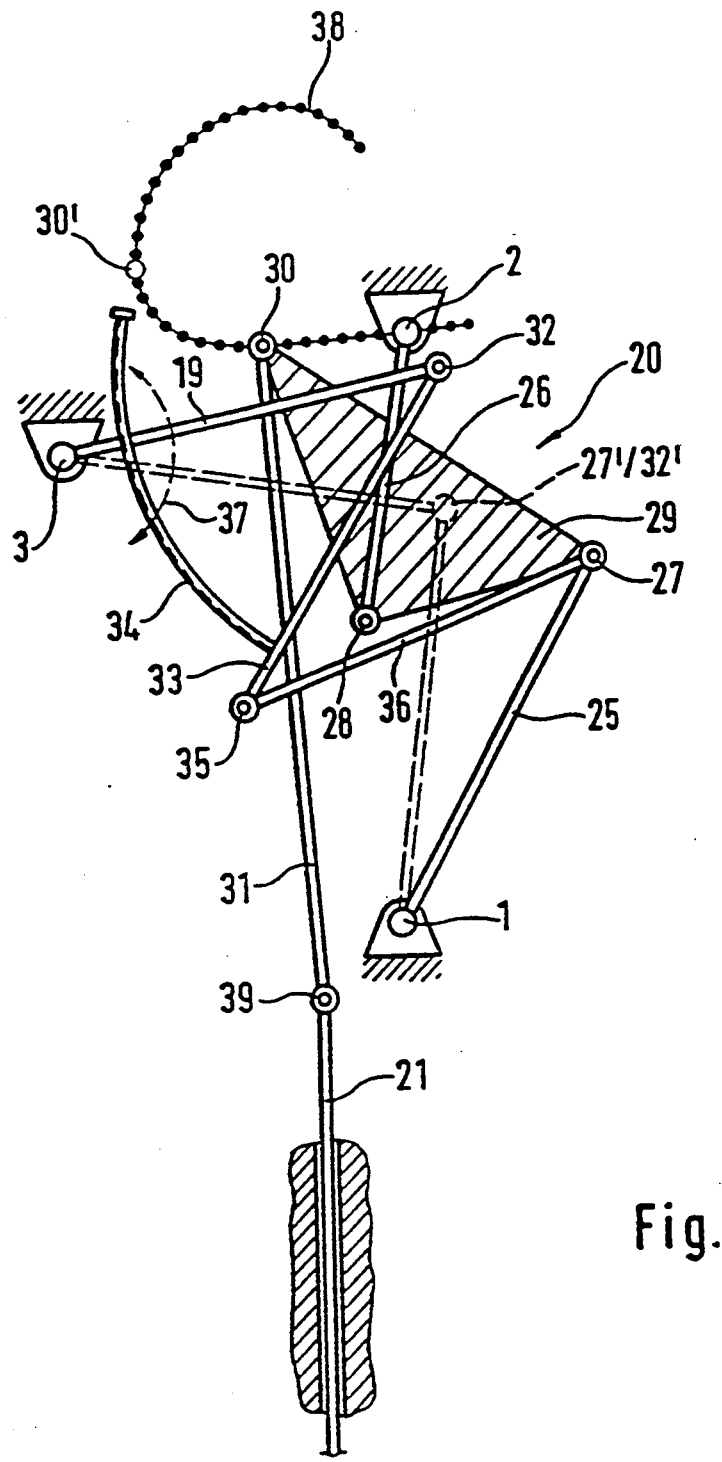
FIG. 4 shows a view, corresponding to that of FIG. 3, of a modified embodiment of the coupler mechanism.

The embodiment of the coupler mechanism 20 illustrated in FIG. 4 corresponds in functional terms to the embodiment illustrated in FIG. 3. The mechanism elements are merely mounted in different positions relative to one another, so that an especially small amount of constructional space is required. In this embodiment, when the lever 19 is in the straight ahead position (joints 27 and 32 being in positions 27′ and 32′ respectively), a line connecting joints 27 and 28 forms an acute angle with longitudinal axes of both levers 25 and 26 in an approximate Z-shape, and the longitudinal axes of the levers 25 and 26 intersect each other as well.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. All-wheel steering arrangement for motor vehicles, with a randomly controllable front-wheel steering mechanism and a rear-wheel steering mechanism which is positively coupled mechanically thereto, comprising:
   a coupler mechanism having a four-bar lever mechanism with two levers articulated at a first end about respective stationary axes and with a link part which is rotatably connected to second ends of the levers in such a manner that, during the pivoting of the levers within a predetermined pivoting range, said link part executes a rotational movement in which a connection part arranged on said link part describes a path which is one of: C-shaped and U-shaped, and which has terminal legs, an output rod having a first end fastened in an articulated manner to said connection part and a second end coupled to the rear-wheel steering mechanism, said output rod being guided on a path which extends transversely relative to said terminal legs wherein
   said front-wheel steering mechanism is mechanically coupled to an input lever of said coupler mechanism, said input lever being pivotable at a first end thereof about a third stationary axis, and having a further lever articulated on a second end thereof, whereby an adjustable angle is formed between said input lever and said further lever, said further lever being coupled in an articulated manner at a second end thereof to one of said two levers of the four-bar lever mechanism via a connecting rod, and
   said input lever, further lever and connecting rod having equal effective lengths whereby, in a straight-ahead position of the steering, the articulated connections between the connecting rod and said one of said two levers, and between the input lever and the further lever, are located one above the other, with mutually aligned axes of articulation.

2. All-wheel steering according to claim 1, wherein the adjustable angle between the input lever and the further lever is controllable as a function of a predetermined parameter.

3. All-wheel steering according to claim 2, wherein said predetermined parameter is driving speed.

4. All-wheel steering according to claim 1, wherein the two levers of the four-bar lever mechanism are of differing lengths.

5. All-wheel steering according to claim 2, wherein the two levers of the four-bar lever mechanism are of differing lengths.

6. All-wheel steering according to claim 1, wherein in a straight-ahead position of the front wheel steering, a connecting line passing through joints between the link part and the two levers of the four-bar lever mechanism connected thereto, forms an acute angle with at least one of said two levers.

7. All-wheel steering according to claim 4, wherein in a straight-ahead position of the front wheel steering, a connecting line passing through joints between the link part and the two levers of the four-bar lever mechanism connected thereto forms an acute angle with at least one of said two levers.

8. All-wheel steering according to claim 6, wherein in a straight-ahead position of the front wheel steering, said connecting line forms acute angles with longitudinal axes of both of said two levers in such a way that said longitudinal axes are jointed to one another by the connecting line in a z-shaped manner.

9. All-wheel steering according to claim 1, wherein in a straight-ahead position of the front wheel steering, longitudinal axes of the two levers connected to said link part intersect one another.

10. All-wheel steering according to claim 6, wherein in a straight-ahead position of the front wheel steering, longitudinal axes of the two levers connected to said link part intersect one another.

11. All-wheel steering according to claim 1, wherein the distance between joints of the four-bar lever mechanism is shorter than the effective length of the shorter lever.

12. All-wheel steering according to claim 1, wherein when said output rod is in a center position the effective length of said input lever is approximately the same as the distance between the third stationary axis an the articulated connection between the connecting rod and said one of said two levers, coupled directly to said connecting rod, of the four-bar lever mechanism.

13. All-wheel steering according to claim 4, wherein when said output rod is in a center position the effective length of said input lever is approximately the same as the distance between the third stationary axis and the articulated connection between the connecting rod and one of said two levers, coupled directly to said connecting rod, of the four-bar lever mechanism.

14. All-wheel steering according to claim 8, wherein when said output rod is in a center position the effective length of said input lever is approximately the same as the distance between the third stationary axis and the articulated connection between the connecting rod and one of said two levers, coupled directly to said connecting rod, of the four-bar lever mechanism.

15. All-wheel steering according to claim 11, wherein when said output rod is in a center position the effective length of said input lever is approximately the same as the distance between the third stationary axis and the articulated connection between the connecting rod and one of said two levers, coupled directly to said connecting rod, of the four-bar lever mechanism.

16. All-wheel steering according to claim 1, wherein one of the two joints between the link part and the two levers of the four-bar lever mechanism is at a distance from the connection part which is greater than the distance between said two joints.

17. All-wheel steering according to claim 4, wherein one of two joints between the link part and the two levers of the four-bar lever mechanism is at a distance from the connection part which is greater than the distance between said two joints.

18. All-wheel steering according to claim 8, wherein one of joints between the link part and the two levers of the four-bar lever mechanism is at a distance from the connection part which is greater than the distance between said two joints.

19. All-wheel steering according to claim 9, wherein respective distances between the connection part and each of two joints between the link part and the two levers of the four bar mechanism are greater than the distance between the two joints.

20. All-wheel steering according to claim 1, wherein the connection part of the link part and two joints between the link part and the two levers of the four-bar lever mechanism form a triangle in a top view of the link part.

21. All-wheel steering according to claim 4, wherein the connection part of the link part and two joints between the link part and the two levers of the four-bar lever mechanism form a triangle in a top view of the link part.

* * * * *